Patented Aug. 14, 1934

UNITED STATES PATENT OFFICE 1,970,204

TREATMENT OF DIATOMACEOUS EARTH WITH CHEMICAL AGENTS

McKinley Stockton, Redondo Beach, Calif., assignor to The Dicalite Company, Los Angeles, Calif., a corporation of Delaware No Drawing. Application August 11, 1933,
Serial No. 684,761

5 Claims. (Cl. 252—2)

The object of my invention is to apply sodium silicate to diatomaceous earth in such manner that products which are not calcined, as well as such as are heated to a calcining temperature, are materially improved in quality.

It is known in the art (see Calvert et al., U. S. Patent 1,502,547) to grind diatomaceous earth with dry sodium chloride or any halide of an alkali or alkali-earth metal and thereafter to calcine at a temperature of the order of 1800° F. Sodium carbonate has also been used in this manner and, while it is not commercial practice, it is known to dissolve these salts in water, wet the earth with the solution and grind the salted earth prior to calcination.

It is also known in the art (North, German Patent 297,884) to moisten diatomaceous earth with a dilute solution of sodium silicate, to subject the moistened earth to pressure in order to diffuse the solution uniformly throughout the mass, and finally to calcine the pressed blocks at a temperature about 1650° F.

I have discovered that sodium silicate has certain properties which render it far superior to the halides or carbonates of the alkali or alkali-earth metals for the treatment of diatomaceous earth; that it may be used to impart valuable properties to diatomaceous products which are not heated to a calcination temperature, and that it may be applied to the earth in a specific manner which greatly increases its usefulness.

The method disclosed in the German patent is entirely impracticable as a commercial operation, both as regards cost and because of the cementing action of the silicate on the compressed blocks when fired, and the conventional practice in the preparation of filtering grades of earth is quite different. This practice, in general terms, is to break the raw earth, as mined or after a partial air drying, into smaller lumps, to simultaneously dry the earth and mill it to powdered form in a high velocity fan blower through which large volumes of heated air are passed with the earth, to intermix the powdered chemical with the powdered earth after the comminuting operation, to heat the mixture to a preferred temperature (ranging from 1800 to 2200° F.) in a kiln or muffle, and finally to remill the calcined product for the reduction to powder of any lumps or aggregations formed during the calcination.

To my knowledge, none of the treating agents above named, including sodium silicate, have been used in the preparation of diatomaceous earth products other than in connection with a calcination step.

In the practice of my invention I follow the general procedure above outlined, varying from it in important particulars which are essential to the attainment of the most desirable results.

First, I restrict myself to the use of sodium silicate for the reason that the evaporation product of solutions of this substance forms a continuous amorphous film which can be extended to a condition of extreme tenuity, while the halides and carbonates of the alkali forming metals are crystalline if intermixed with the earth in the dry form and likewise form crystals or crystalline aggregates in drying from an aqueous solution.

When the diatomaceous earth product is to be subjected to calcination, the differences between a crystalline and a noncrystallizable treating agent or flux are material and important. The noncrystallizable silicate applied by my method and in the form of a solution and uniformly distributed through the earth mass leaves, on evaporation, highly attenuated films coating the d atoms. The crystallizable salts, even if applied in the form of a solution, form solid crystals which are relatively very large as compared with the minute diatoms, while the solid particles resulting from dry application of the crystalline flux are even larger. These particles, becoming semifluid during the calcining operation, nodulize by aggregating a multiplicity of diatoms. The dense nodules thus formed cannot be broken down and dispersed through the remainder of the earth without recourse to such temperatures as produce sintering, agglomeration and extreme shrinkage of the diatoms, and as such temperatures produce highly undesirable qualities in the finished product, it is customary to allow the nodules to pass through into the output as a dense, nonporous waste which seriously depreciates its quality.

Further, I have discovered that sodium silicate solution, when dispersed through the earth and dried at a temperature materially below that of calcination, forms glassy films which cover the structure of the diatom without filling its pores, and that these films greatly increase the strength of the diatom and its resistance to destructive impacts as in remilling. This added strength permits the preparation of certain products having the strength and porosity of calcined earths at temperatures below that at which the shrinkage incident to calcination takes place. These products are of a superior degree of lightness and are obtained at a materially lowered cost. The crystalline treating agents heretofore used are of no value whatever for this purpose because of their inability to form a coherent film.

Second, in the preparation of earths for calcination (but not in their preparation without calcination) I limit myself to a specific manner of applying the silicate to the earth. I first bring it into solution in water, this solution being preferably but not necessarily of about 50° Baumé. The object in using so strong a solution is to reduce the amount of water to be removed in the combined drying and milling operation, and when such reduction is not a prime factor a more dilute solution may be used.

In any case in which calcination is to be the final step in the process, the solution is introduced directly into the suction of the fan blower in which the broken earth is powdered and simultaneously dried as above described. In a method of manipulation which is my own invention and not present practice, I heat the earth, in the broken lump form and prior to its entry to this fan, to a temperature ranging from 900° to 1500° F., this being the range through which complete dehydration of the earth takes place without too closely approaching the minimum temperature of calcination. When this method is followed, I prefer to introduce the silicate to the earth during the milling operation which follows this preliminary heating step and while it is still in a heated condition.

The improved heating method above referred to is not claimed herein except in combination with the treatment with sodium silicate, but is fully described and claimed in a copending application filed by me on August 11, 1933, under Serial No. 684,762.

Instead of heating to this relatively high temperature I may follow the conventional practice at this stage and heat only to say 300° to 400° F. In either case, the silicate solution enters a column of heated air moving at a high velocity and containing the earth in suspension. This earth-carrying air column together with the silicate solution enter the milling fan where the solid is comminuted and the solution dispersed through the powdered product under conditions of the most extreme turbulence, while at the same time the water is removed from the powdered particles while they are in a state of suspension. By these concomitant effects of milling, dispersal and dessication the silicate is more evenly and completely filmed over the earth particles than is possible in any other manner of intermixing. Further, and even more important, the particles are retained in air suspension until the film becomes completely dry and ceases to be adhesive. The last named result is of the utmost importance where the silicate coated powder is passed to a calcining operation, as lumped or balled material is very unequally heated during calcination and may be in part fritted to a solid mass by the fluxing effect of any local excess of silicate.

While I consider the above described method of introducing the silicate to be extremely desirable even though the product is not to be calcined, I do not limit myself to this sole method in making uncalcined products. As these are finished at a much lower temperature the danger of fritting or cementing is avoided and it is possible to obtain a useful if not the best result by adding the solution to the once milled powder and thereafter passing it through any drying operation in which it is thoroughly mixed and equalized.

While I do not limit myself to any specific soda to silica relation in the silicate used, I prefer a reagent having approximately the ratio $Na_2O : SiO_2 :: 1.0 : 1.9.$ The quantity used will vary with the nature of the final product desired and with the characteristics of the crude earth, but will usually range between 2% and 6% of the weight of the dry earth in terms of the $Na_2O$ content of the silicate. In many cases a dose which will add about 3.5% of $Na_2O$ to the earth will give, in connection with a calcining operation, a filtering earth having the highest flow rate and the lowest wet density.

I claim as my invention:

1. In the preparation of powdered diatomaceous earth products, the steps comprising: heating the earth in the form of broken lumps to a temperature not exceeding 1500° F. and sufficient to produce dehydration of said earth; introducing the heated earth together with aqueous solution of sodium silicate into a comminuting operation; simultaneously comminuting the earth and intermixing the sodium silicate therewith; substantially drying the resultant mixture by heating, and terminating last said heat treatment at a temperature substantially below the minimum temperature of calcination or shrinkage.

2. The method of producing an uncalcined diatomaceous earth product which comprises: comminuting the earth and intermixing an aqueous solution of sodium silicate with said earth; substantially removing the water from said solution and said earth by gentle heating while maintaining said earth in sufficient agitation to prevent agglomeration of its constituent particles, and finishing the treatment of said earth by heating to a temperature not exceeding 1500° Fahr.

3. The method of treating diatomaceous earth with sodium silicate which comprises: heating said earth in the form of broken lumps to a temperature not exceeding 1500° Fahr. and suspending said earth in a stream of heated air; introducing a stream of an aqueous solution of sodium silicate into said air and earth stream; passing said mixed stream through a zone of turbulence wherein said earth is comminuted and said silicate is intimately intermixed with the particles produced by comminution; maintaining said earth and silicate in suspension in said air stream until the water of solution is removed from said silicate, and removing said earth and silicate from said air stream as a substantially dry powder.

4. The method of treating diatomaceous earth with sodium silicate which comprises: comminuting and heating said earth while in suspension in a stream of heated air to a temperature sufficient only to remove free water from said earth; introducing a stream of an aqueous solution of sodium silicate into said air and earth stream; passing said mixed stream through a zone of turbulence wherein said silicate is intimately intermixed with the comminuted earth particles; maintaining said earth and silicate in suspension in said air stream until the water of solution is removed from said silicate, and separating said earth and silicate from said air stream as a substantially dry powder.

5. A method substantially as and for the purpose set forth in claim 4, in which the operations of comminution, heating and addition of sodium silicate to said earth are simultaneously performed within said zone of turbulence.

McKINLEY STOCKTON.